US008209166B2

(12) United States Patent
Chino et al.

(10) Patent No.: US 8,209,166 B2
(45) Date of Patent: Jun. 26, 2012

(54) APPARATUS, METHOD, AND COMPUTER PROGRAM PRODUCT FOR MACHINE TRANSLATION

(75) Inventors: Tetsuro Chino, Kanagawa (JP); Satoshi Kamatani, Kanagawa (JP); Kentaro Furihata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1062 days.

(21) Appl. No.: 12/050,521

(22) Filed: Mar. 18, 2008

(65) Prior Publication Data

US 2009/0012776 A1     Jan. 8, 2009

(30) Foreign Application Priority Data

Jul. 3, 2007 (JP) ................................. 2007-175379

(51) Int. Cl.
*G06F 17/20* (2006.01)
*G06F 17/28* (2006.01)
*G06F 17/21* (2006.01)
*G06F 17/27* (2006.01)
*G10L 11/00* (2006.01)
(52) U.S. Cl. ............ 704/2; 704/1; 704/3; 704/4; 704/5; 704/6; 704/7; 704/8; 704/9; 704/10; 704/277
(58) Field of Classification Search ................ 704/2–10, 704/277
See application file for complete search history.

(56) References Cited

U.S. PATENT DOCUMENTS

| | | | | |
|---|---|---|---|---|
| 5,843,389 A | * | 12/1998 | Elsner et al. | ................... 423/162 |
| 6,067,510 A | * | 5/2000 | Kimura et al. | ................... 704/7 |
| 6,330,530 B1 | * | 12/2001 | Horiguchi et al. | ............ 704/277 |
| 6,442,524 B1 | * | 8/2002 | Ecker et al. | ................... 704/277 |
| 6,516,296 B1 | * | 2/2003 | Fuji | ................................ 704/3 |
| 6,885,985 B2 | * | 4/2005 | Hull | .............................. 704/277 |
| 7,050,964 B2 | * | 5/2006 | Menzes et al. | ..................... 704/2 |
| 7,283,949 B2 | * | 10/2007 | Shieh | ................................. 704/4 |

(Continued)

FOREIGN PATENT DOCUMENTS

JP         07-334506       * 12/1995

(Continued)

OTHER PUBLICATIONS

Takezawa, T. et al. (1999). A New Evaluation Method for Speech Translation Systems and a Case Study on ATR—MATRIX from Japanese to English. In Proceedings of MT Summit VII (pp. 299-307). Tokyo, Japan: Asian-Pacific Association for Machine Translation (AAMT).*

(Continued)

*Primary Examiner* — Paras Shah
(74) *Attorney, Agent, or Firm* — Finnegan, Henderson, Farabow, Garrett & Dunner, L.L.P.

(57) ABSTRACT

A concept obtaining unit obtains, for each example set stored in an example storage unit, a first concept of a phrase included in an example in the first language and a second concept of a phrase included in an example in the second language from a concept storage unit. A determining unit determines that an example set including an unmatched concept between first concepts and second concepts is not applicable. An example set searching unit searches for an example set that includes an example in the first language that is analogous to or matches an input sentence. An output controlling unit outputs an example in the second language of the example sets from which the example set that is determined as inapplicable is deleted, as a translation result.

10 Claims, 15 Drawing Sheets

U.S. PATENT DOCUMENTS

| | | | |
|---|---|---|---|
| 7,346,487 B2 * | 3/2008 | Li | 704/2 |
| 7,467,081 B2 * | 12/2008 | Alshawi et al. | 704/10 |
| 7,539,619 B1 * | 5/2009 | Seligman et al. | 704/2 |
| 8,060,359 B2 * | 11/2011 | Kimura | 704/4 |
| 2002/0173946 A1 * | 11/2002 | Christy | 704/2 |
| 2005/0010421 A1 * | 1/2005 | Watanabe et al. | 704/277 |
| 2006/0224378 A1 | 10/2006 | Chino et al. | |
| 2007/0124131 A1 | 5/2007 | Chino et al. | |
| 2008/0086300 A1 * | 4/2008 | Anismovich et al. | 704/9 |
| 2008/0133245 A1 * | 6/2008 | Proulx et al. | 704/277 |

FOREIGN PATENT DOCUMENTS

| | | |
|---|---|---|
| JP | 2002-7392 | 1/2002 |

OTHER PUBLICATIONS

U.S. Appl. No. 12/050,563, filed Mar. 18, 2008, to Satoshi Kamatani et al.

* cited by examiner

FIG.2

| ADDRESS | JAPANESE EXAMPLE J | ENGLISH EXAMPLE E | CHINESE EXAMPLE C |
|---|---|---|---|
| a1 | こんにちは | Hello. | 你好 |
| a2 | 一人幾らくらいですか? | How much is it for one person? | - |
| a3 | 美味しいレストランはどこにありますか? | Where is a good restaurant? | - |
| a4 | 今朝鼻血が出ました。 | My son had nosebleed this morning. | - |
| a5 | 道具のレンタル料はいくらですか? | How much does it cost to rent a racket? | - |
| a6 | 一時間10元です。 | 10 yuan for each car per hour. | 每辆车1小时10元。 |
| a7 | 目的を成し遂げるために自らを励ましました。 | - | 卧薪尝胆。 |
| a8 | 至急電報でお願いします。 | Urgent, please. | 请用加急电报。 |
| a9 | この伝言を電報で送ってください。 | Please send this message by telegram. | 请把这个内容用电报发出去。 |

FIG.3

| ADDRESS | CONCEPT CLASS N | SUBCLASS CONCEPT ID LIST | CORRESPONDING JAPANESE WORD LIST J | CORRESPONDING ENGLISH WORD LIST E | CORRESPONDING CHINESE WORD LIST C |
|---|---|---|---|---|---|
| b1 | TIME | ... | 今朝、時間、... | morning, hour, ... | 小时, ... |
| b2 | PHYSIOLOGICAL PHENOMENON | ... | 鼻血、... | nosebleed, ... | ... |
| b3 | PERSON | ... | ... | son, ... | ... |
| b4 | CURRENCY | ... | 元、... | yuan, ... | 元, ... |
| b5 | MEANS OF TRANSPORTATION | ... | ... | car, ... | 车, ... |
| ... | ... | ... | ... | ... | ... |
| b6 | THING | b4, b5, b7,... | ... | ... | ... |
| b7 | TOOL | b8,... | 道具、... | ... | ... |
| b8 | SPORTS EQUIPMENT | ... | ... | racket, ... | ... |
| ... | ... | ... | ... | ... | ... |
| b9 | TO AIM | ... | 目的、... | ... | ... |
| b10 | TO ACHIEVE | ... | 成し遂げる、... | ... | ... |
| b11 | ME | ... | 自ら、... | ... | ... |
| b12 | TO ENCOURAGE | ... | 励ます、... | ... | ... |
| b13 | TO SLEEP | ... | ... | ... | 卧, ... |
| b14 | TO BURN | ... | ... | ... | 薪, ... |
| b15 | TO PRAISE | ... | ... | ... | 尝, ... |
| b16 | TO LOOSEN | ... | ... | ... | 胆, ... |

FIG.4

| ADDRESS | EXAMPLE SET ADDRESS | JAPANESE CONCEPT CLASS LIST J | ENGLISH CONCEPT CLASS LIST E | CHINESE CONCEPT CLASS LIST C |
|---|---|---|---|---|
| c1 | a1 | ... | ... | ... |
| c2 | a2 | PERSON, CURRENCY | CURRENCY, PERSON | |
| c3 | a3 | ... | ... | ... |
| c4 | a4 | TIME, PHYSIOLOGICAL PHENOMENON | PERSON, PHYSIOLOGICAL PHENOMENON, TIME | ... |
| c5 | a5 | TOOL, CURRENCY | CURRENCY, SPORTS EQUIPMENT | |
| c6 | a6 | TIME, CURRENCY | CURRENCY, MEANS OF TRANSPORTATION, TIME | MEANS OF TRANSPORTATION, TIME, CURRENCY |
| c7 | a7 | TO AIM, TO ACHIEVE, ME, TO ENCOURAGE | ... | TO SLEEP, TO BURN, TO PRAISE, TO LOOSEN |
| c8 | a8 | ... | ... | ... |
| c9 | a9 | ... | ... | ... |

FIG.5

| ADDRESS | EXAMPLE SET ADDRESS | J TO E | J TO C | E TO J | E TO C | C TO J | C TO E |
|---|---|---|---|---|---|---|---|
| d1 | a1 | ○ | ○ | ○ | ○ | ○ | ○ |
| d2 | a2 | ○ | — | ○ | — | — | — |
| d3 | a3 | ○ | — | ○ | — | — | — |
| d4 | a4 | × | — | ○ | — | — | — |
| d5 | a5 | × | — | ○ | — | — | — |
| d6 | a6 | × | × | ○ | ○ | ○ | ○ |
| d7 | a7 | — | ○ | — | — | ○ | — |
| d8 | a8 | ... | ... | ... | ... | ... | ... |
| d9 | a9 | ... | ... | ... | ... | ... | ... |

FIG.11

| ADDRESS | EXAMPLE SET ADDRESS | J TO E | J TO C | E TO J | E TO C | C TO J | C TO E | TRANSLATION EDITING |
|---|---|---|---|---|---|---|---|---|
| d1 | a1 | ○ | ○ | ○ | ○ | ○ | ○ | × |
| d2 | a2 | ○ | — | ○ | — | — | — | ○ |
| d3 | a3 | ○ | — | ○ | — | — | — | ⋮ |
| d4 | a4 | × | — | ○ | — | — | — | ⋮ |
| d5 | a5 | × | — | ○ | — | — | — | ⋮ |
| d6 | a6 | × | × | ○ | ○ | ○ | ○ | ⋮ |
| d7 | a7 | — | ○ | — | ○ | ○ | — | × |
| d8 | a8 | ⋮ | ⋮ | ⋮ | ⋮ | ⋮ | ⋮ | ⋮ |
| d9 | a9 | ⋮ | ⋮ | ⋮ | ⋮ | ⋮ | ⋮ | ⋮ |

APPARATUS, METHOD, AND COMPUTER PROGRAM PRODUCT FOR MACHINE TRANSLATION

CROSS-REFERENCE TO RELATED APPLICATIONS

This application is based upon and claims the benefit of priority from the prior Japanese Patent Application No. 2007-175379, filed on Jul. 3, 2007; the entire contents of which are incorporated herein by reference.

BACKGROUND OF THE INVENTION

1. Field of the Invention

The present invention relates to an apparatus, a method, and a computer program product for performing machine translation on a sentence input in a source language to obtain a sentence in a target language.

2. Description of the Related Art

Machine translation technologies have been developed to automatically translate an expression in a certain language to a semantically equivalent expression in a different language such as between Japanese and English. The machine translation system is widely used especially for written words. The technologies incorporated to realize the machine translation can be divided into two broad types, rule-based translation and corpus-based translation.

In the rule-based translation, rules are described for grammar and vocabulary information on each language and correspondence in vocabulary and sentence structure between any two languages that are dealt with in translation so that the conversion between the languages can be implemented according to the rules.

The development of rules and dictionaries for use in the rule-based translation requires not only a high level of knowledge of both a source language and a target language of the translation but also a high level of knowledge of semantic and grammatical relationship between these languages. Furthermore, because of infinite diversity of languages, the rule development requires enormous amounts of time and exhaustive works based the high-level knowledge. In addition, such a rule development needs to be performed for each pair of source and target languages. A problem also resides in that the outcome of the translation is automatic and unnatural because infinitely variable sentences are translated based on a finite number of rules.

As a solution of overcoming such problems in the rule-based translation, corpus-base translation is widely applied. In the corpus-based translation, a large number of examples of expression pairs in two languages that are semantically equivalent to each other are collected, and the language conversion is performed with reference to the collected examples. Systems such as translation memory (TM), example based machine translation (EBMT), and stochastic machine translation (SMT) are well known as the corpus-based translation.

The TM system searches for example pairs that include the same expression in the source language as the one that is input, and outputs a translation of the expression. The EBMT system searches for example pairs including an expression in the source language that is similar to the one that is input, and obtains a semantically equivalent expression in the target language, based on the translations of the searched examples. The SMT system obtains a translation of an expression input in the source language, based on statistical information from massive example data that has become available.

The corpus-based translation is advantageous in that the translated outcome is natural and reliable and also that the development is relatively easy, which makes multiple-language application easy. In the following description, the EBMT system is used as a typical example of the corpus-base translation unless otherwise specified.

In relation to the corpus-based translation, JP-A 2002-7392 (KOKAI) suggests a technology of setting a source language pattern and a target language pattern in accordance with a translation direction so that patterns do not have to be created for each translation language.

It should be noted that, when words are expressed, the meaning of the words can be interpreted not from the expression (literal sense of the words, or a string of characters) only, but from a combination of the expression and the situation in which the words are expressed.

It is this aspect of words that enhances the efficiency of words as a communication tool, with one word having various meanings depending on situations. The situation may include the standpoints, roles and relationship of a speaker and a listener, or the place, time, objects surrounding them, and already established conditions, and moreover, the knowledge and beliefs of the speaker and the listener, their knowledge and beliefs about each other, and many other factors.

For this reason, an expression in a language in an example incorporated in the corpus-based translation can be considered as having an equivalent meaning only under a limited situation that is specified for each translation pair.

In most cases, however, translation example pairs in the corpus-based translation include words for the examples in different languages, or "expressions" only, and the information on the situation in which such expressions are made is not included.

On the other hand, because the corpus-based translation requires a massive corpus of translations, it is difficult to exclude example pairs used in a particular context (situation) or ones with freely translated phrases or fixed phrases such as fable-based and idiomatic phrases from the corpus.

According to the conventional corpus-based translation technologies as described in JP-A 2002-7392 (KOKAI), an example pair is selected in consideration of similarity in phrases only, regardless of the situation where the words are uttered, which sometimes results in a translated sentence that is not semantically equivalent. In other words, the outcome of the translation may be unnatural or incorrect, and naturalness and high reliability that are supposed to be advantages of the corpus-based translation may not be attained.

To solve this problem, a method of automatically detecting part of the situation of utterance or attaching part of the situation to example pairs in advance may be considered. However, it is very difficult to mechanically perform these operations. Partial information on the situation may be manually attached to the example pair, but this does not support the advantage of the corpus-based translation in ease of development.

SUMMARY OF THE INVENTION

According to one aspect of the present invention, a machine translation apparatus includes an example storage unit that stores an example set in which examples in the example set are described in at least two languages including a first language and a second language and have possibly equivalent meanings are associated with each other; a concept storage unit that stores a phrase in the first language, a phrase in the second language, and a concept representing a meaning shared by the phrase in the first language and the phrase in the second language, in association with one another; a first concept obtaining unit that obtains a first concept from the concept storage unit, the first concept corresponding to the phrase included in an example in the first language of the example set stored in the example storage unit; a second concept obtaining unit that obtains a second concept from the concept storage unit, the second concept corresponding to the phrase included in an example in the second language of the example set stored in the example storage unit; a determining unit that determines whether there is any unmatched concept between the first concept and the second concept, and determines that the example set including the unmatched concept is not applicable when there is the unmatched concept; a receiving unit that receives an input sentence in the first language; an example set searching unit that searches for any example sets including the example in the first language that is analogous to or matches the input sentence; a deleting unit that deletes the example set that is determined as inapplicable from the example sets searched by the example set searching unit; and an output controlling unit that outputs, as a translation result, an example in the second language included in the example sets from which the example set that is determined as inapplicable is deleted.

According to another aspect of the present invention, a machine translation method includes obtaining a concept as a first concept from a concept storage unit, the concept corresponding to a phrase included in an example in a first language of an example set stored in an example storage unit, the concept storage unit storing a phrase in the first language, a phrase in a second language, and a concept representing a meaning shared by the phrase in the first language and the phrase in the second language, in association with one another, the example storage unit storing the example set in which examples in the example set are described in at least two languages including the first language and the second language and have possibly equivalent meanings are associated with each other; obtaining a concept as a second concept from the concept storage unit, the concept corresponding to a phrase included in an example in the second language of the example set stored in the example storage unit; determining whether there is any unmatched concept between the first concept and the second concept; determining that the example set having the unmatched concept is not applicable when there is the unmatched concept; receiving an input sentence in the first language; searching for any example sets that includes the example in the first language that is analogous to or matches the input sentence; deleting the example set that is determined as inapplicable from the searched example sets; and outputting the example in the second language included in the example sets from which the example set that is determined as inapplicable is deleted, as a translation result.

A computer program product according to still another aspect of the present invention causes a computer to perform the method according to the present invention.

BRIEF DESCRIPTION OF THE DRAWINGS

FIG. 2 is a diagram for explaining an example of a data structure of translation examples;

FIG. 3 is a diagram for explaining an example of a data structure of thesaurus information;

FIG. 4 is a diagram for explaining an example of example analysis information;

FIG. 5 is a diagram for explaining an example of applicability information according to the first embodiment;

FIG. 11 is a diagram for explaining an example of applicability information according to the second embodiment;

DETAILED DESCRIPTION OF THE INVENTION

The exemplary embodiments of an apparatus, a method, and a computer program product for machine translation according to the present invention are explained in detail below with reference to the attached drawings.

The problems that are discussed above are pronounced especially in a multi-language translation corpus dealing with three languages or more. In addition, the conventional technologies are not capable of preparing translation pairs or sets that have perfectly equivalent meanings due to differences between semantic systems of the languages. This often incurs mistranslations.

To avoid such problems, a method of preparing a (multilingual) corpus consisting of perfectly equivalent phrases in the meanings or a method of visually checking the corpus may be considered. However, an advantage of the corpus-based translation in the ease of the development and multi-language application to would be lost.

A machine translation apparatus according to a first embodiment of the present invention compares concept classes of words that are included in examples in two languages, judges the applicability for each translation direction when the concept classes do not match so that only applicable example sets can be used. This function eliminates the need to compile a perfect translation corpus by visually checking it, for example.

In the following explanation, a corpus-based machine translation apparatus of a translation memory system including sets of translation phrases in Japanese, English, and Chinese is discussed. The combination of the languages is not limited to this example, however. Two languages or more should be dealt with.

Figure 1:
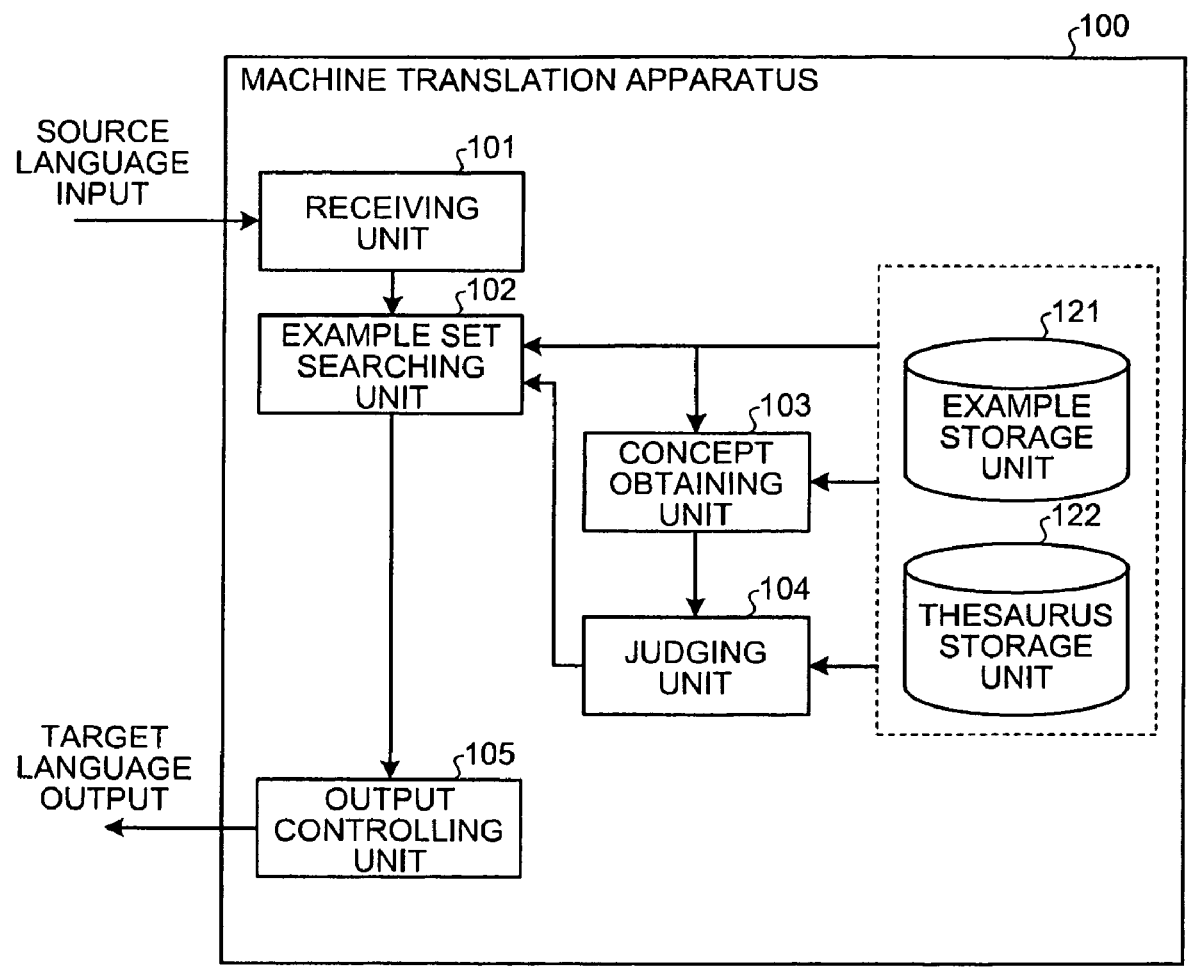
FIG. 1 is a block diagram of a machine translation apparatus according to a first embodiment of the present invention.

As shown in FIG. 1, a machine translation apparatus 100 includes an example storage unit 121, a thesaurus storage unit 122, a receiving unit 101, an example set searching unit 102, a concept obtaining unit 103, a judging unit 104, and an output controlling unit 105.

The example storage unit 121 stores therein sets of example phrases in different languages that are semantically substantially equivalent to one another.

As indicated in FIG. 2, each entry in the example storage unit 121 represents a set of example phrases, and each phrase is associated with phrases in other languages in the same set that are semantically equivalent or almost equivalent. In particular, each example entry includes an address for identifying the entry, a Japanese example J showing a Japanese phrase, an English example E showing an English phrase, and a Chinese example C showing a Chinese phrase.

For example, in the entry at address a1, a Japanese example 201, an English example 202, and a Chinese example 203 are associated with one another as a set of greeting phrases, all meaning "hello".

When no example is available in an entry, the example storage unit 121 enters a symbol "-" in the corresponding cell. In the entry at address a2, for example, a Japanese example 204 and an English example 205 are associated with each other to form a set that means "How much is it for one person?" There is no corresponding Chinese phrase, however. Thus, the symbol "-" is entered for a Chinese example 206.

The thesaurus storage unit 122 in FIG. 1 stores therein thesaurus information in which concept classes representing the meanings of words, superclass-subclass relations among the concept classes, and words that belong to each of the concept classes are associated with one another.

As indicated in FIG. 3, each entry in the thesaurus information includes, as information on a concept class, an address for identifying the entry, a concept class N, a subclass concept ID list, a corresponding Japanese word list J, a corresponding English word list E, and a corresponding Chinese word list C.

In an entry at address b1, for example, the concept class is "time", and a Japanese word 301 meaning "this morning", a Japanese word 302 meaning "time" and the like are included as Japanese words that belong to this concept class. Furthermore, words "morning", "hour", and the like are included as English words that belong to this concept class, whereas a Chinese word 303 meaning "time" and the like are included as Chinese words that belong to the concept class.

The symbol " . . . " indicates an omission of a portion unessential to the explanation. The entry at address b7 has a concept class "tool", and its subclass concept ID list shows "b8, . . . ". This means that the entry is a higher concept of the concept class at address b8. In other words, the table indicates that the concept class of the entry at address b8 is "sports equipment", and that the concept class "sports equipment" is a subclass concept of the concept class "tool".

The concept classes at addresses b9 to b16 are provided by the inventors on their own by referring to the first level of a hierarchy according to "Ruigo Dai-jiten" (ISBN4-06-123290-8), edited by Takeshi Shibata and Susumu Yamada, published by Kodansha.

In FIG. 3, the concept classes are described in English for convenience of explanation. The description may be given in any other language or in any other manner. Furthermore, because addresses for identifying the concept classes are provided, the table may be configured without the concept classes.

The example storage unit 121 and the thesaurus storage unit 122 can be formed of any recording medium that is widely used, such as a hard disk drive (HDD), an optical disk, a memory card, and a random access memory (RAM).

In FIG. 1, the receiving unit 101 receives a sentence input in a source language by the user. For example, when a source language sentence is input in the form of voice, image or the like, the receiving unit 101 may apply a voice recognition technology, a character recognition technology, an image recognition technology, a combination of these technologies to the input sentence and receive a sentence that is converted into a character string. The sentence inputting is not limited to the above method, but any conventional method may be adopted as long as the sentence can be received in the form of a character string. It is assumed here that the target language of the translation is designated in a separate process.

The example set searching unit 102 searches across the example storage unit 121 for an applicable example set that can be used for the received sentence. For example, when the source language is Japanese and the separately designated target language of the translation is English, the example set searching unit 102 first looks for an example set in which the content of the Japanese example J either matches or is similar to the source language input and the cell of the English example E does not show "-". When an applicable entry is found, the example set searching unit 102 outputs the address of the entry as an applicable example set.

The similar example searching process executed by the example set searching unit 102 may be realized in the same manner as a conventionally used process of searching for similar sentences such as in the translation memory, example based machine translation, stochastic machine translation, and information retrieval.

The concept obtaining unit 103 analyzes the example sets stored in the example storage unit 121, and obtains a list of concept classes for each word in the examples of each example set by referring to the thesaurus storage unit 122. The concept obtaining unit 103 stores the obtained concept class list and example analysis information that is associated with the addresses of the example sets in a storage unit (not shown) inside the concept obtaining unit 103.

As indicated in FIG. 4, each entry of the example analysis information includes an address that identifies a corresponding item of the example analysis information, an example set address, a Japanese example concept class list J, an English example concept class list E, and a Chinese example concept class list C, which are stored in association with one another.

For each entry of the example analysis information, an address of an item subjected to the analysis in the example set is recorded in the example set address column. In addition, concept classes that are found from the thesaurus storage unit 122 are listed and recorded in the column of the Japanese example concept class list J as concept classes that correspond to expressions appearing in the Japanese example of the corresponding example set. In a similar manner, concept classes extracted from the English example of the corresponding example set are listed and recorded in the column of the English example concept class list E. Furthermore, concept classes extracted from the Chinese example of the corresponding example set are listed and recorded in the column of the Chinese example concept class list C. In the same manner as FIG. 2, a symbol "-" is entered in a cell for which no corresponding example is available. Moreover, a symbol " . . . " represents omission of an item that is unrelated to the explanation.

The judging unit 104 suitably refers to the example storage unit 121, the thesaurus storage unit 122, and the example analysis information stored in the concept obtaining unit 103, and determines whether an example set is applicable for each translation direction of the source language and the target language.

More specifically, the judging unit 104 first compares the concept classes of phrases included in an example of the source language with the concept classes of phrases included in an example of the target language, and obtains any unmatched concept that indicates an unmatched portion between the two groups of concept classes. Then, the judging unit 104 analyzes to see whether the unmatched concept is found in the source language example or the target language example, or when unmatched concepts are found in both examples, analyzes the superclass-subclass relations of these unmatched concepts. The judging unit 104 thereby makes a determination for each translation direction as to whether the example set is applicable. The judging unit 104 may be configured to determine that the example set is not applicable when an unmatched concept is found.

The judging unit 104 stores the applicability information indicating the judgment result in a storage unit or the like (not shown) inside the judging unit 104. As indicated in FIG. 5, each entry of the applicability information includes an address for identifying the applicability information, the example set address, and cells for indicating applicability information for each translation direction of the example set (Japanese to English, Japanese to Chinese, English to Japanese, English to Chinese, Chinese to Japanese, and Chinese to English).

Furthermore, applicability information of example sets is entered for each translation direction in the corresponding one of columns for Japanese to English, Japanese to Chinese, English to Japanese, English to Chinese, Chinese to Japanese, and Chinese to English. In particular, when an example set is applicable, a symbol "o" is entered, whereas when an example set is not applicable, a symbol "x" is entered.

It should be noted that, for example, "Japanese to English" represents a translation direction where the source language is Japanese and the target language is English. The symbol "-" represents that there is no example in relation to the corresponding translation direction. The symbol " . . . " represents omission of a portion unrelated to the explanation.

For example, in FIG. 5, the entry of address d1 shows applicability information for the example set of address a1, with the symbol "o" entered in all the cells for Japanese to English, Japanese to Chinese, English to Japanese, English to Chinese, Chinese to Japanese, and Chinese to English. Thus, this example is applicable in all the six translation directions regarding Japanese, English, and Chinese.

Furthermore, the entry of address d4 shows applicability information corresponding to the example set of address a4, where the applicability for the direction of English to Japanese is "o", the applicability for the direction of Japanese to English is "x", and the applicability for other directions, Japanese to Chinese, English to Chinese, Chinese to Japanese, and Chinese to English is "-". This means that the example set includes Japanese and English examples only, and that the example from English to Japanese is applicable, but the example from Japanese to English is not applicable.

In FIG. 1, when the example set searching unit 102 searches for an example set, the output controlling unit 105 removes sets that are not judged as applicable from the found example sets, and retrieves target language examples from example sets that are judged as applicable to present them to the user as a translation result.

Next, the process performed by the machine translation apparatus 100 according to the first embodiment as discussed above is explained. According to the first embodiment, an applicability information setting process of judging the applicability of examples stored in the example storage unit 121 and setting the applicability information and a machine translation process of performing translation by use of applicable examples in accordance with the applicability information are executed.

Figure 6:
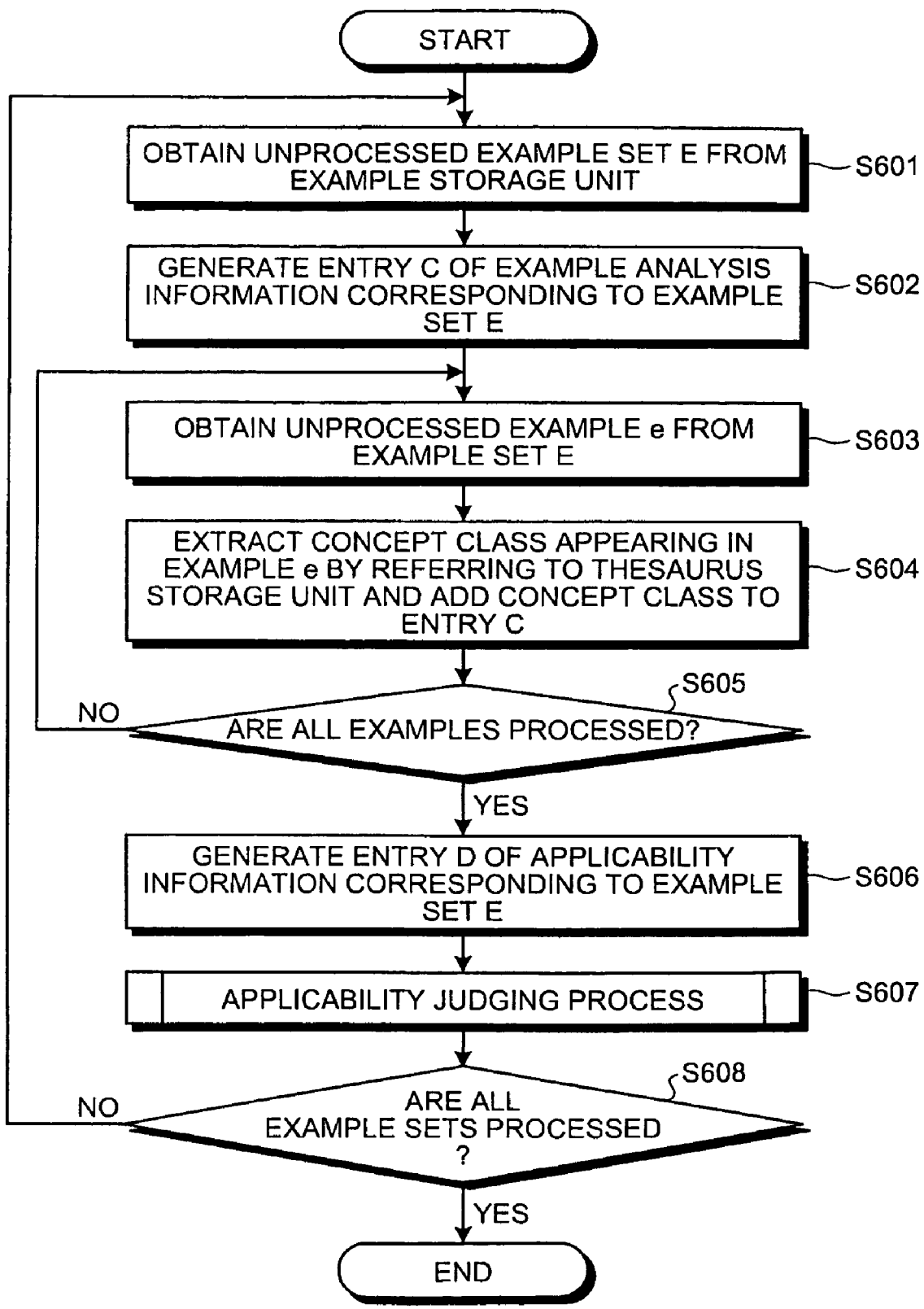
FIG. 6 is a flowchart of a machine translation process according to the first embodiment.

First, the applicability information setting process is explained with reference to FIG. 6.

The concept obtaining unit 103 obtains an example set E that has not yet been processed, from the example storage unit 121 (step S601). Next, the concept obtaining unit 103 produces a new entry C for the example analysis information of the obtained example set E (step S602).

Thereafter, the concept obtaining unit 103 obtains an example e that has not yet been processed from among the examples included in the example set E (step S603). Next, the concept obtaining unit 103 refers to the thesaurus storage unit 122, extracts concept classes included in the example e, and adds them into the entry C (step S604).

More specifically, the concept obtaining unit 103 obtains concept classes from the thesaurus storage unit 122 for each word or phrase included in the example e, and adds them to a corresponding cell of the entry C (the Japanese example concept class list J, the English example concept class list E, or the Chinese example concept class list C).

Next, the concept obtaining unit 103 determines whether all the examples included in the example set E are processed (step S605). If there are any examples that are not yet processed (NO at step S605), the process is repeated by obtaining the next example (step S603).

When all the examples are processed (YES at step S605), the judging unit 104 produces a new entry D for the applicability information of the example set E (step S606).

Next, the judging unit 104 executes the applicability judging process of judging the applicability of the example set by referring to the concept classes extracted by the concept obtaining unit 103 (step S607). The applicability judging process will be described later in detail.

Next, the concept obtaining unit 103 determines whether all the example sets stored in the example storage unit 121 have been processed (step S608). If there is any example set that is not yet processed (NO at step S608), the next example set is obtained to repeat the process (step S601). If all the example sets have been processed (YES at step S608), the applicability information setting process is terminated.

In this manner, the applicability of an example set is judged and the result of the judgment is set as applicability information before the actual machine translation. The applicability information setting process does not have to be executed onto all the example sets in advance. The process should be executed before the process of obtaining a target language example that corresponds to the input source language sentence, at the latest, so that the applicability of the example can be determined.

For example, the applicability information setting process may be executed on the obtained example sets during the machine translation process, and the machine translation may be completed by use of applicable example sets extracted in accordance with the result of the applicability information setting process.

Figure 7:
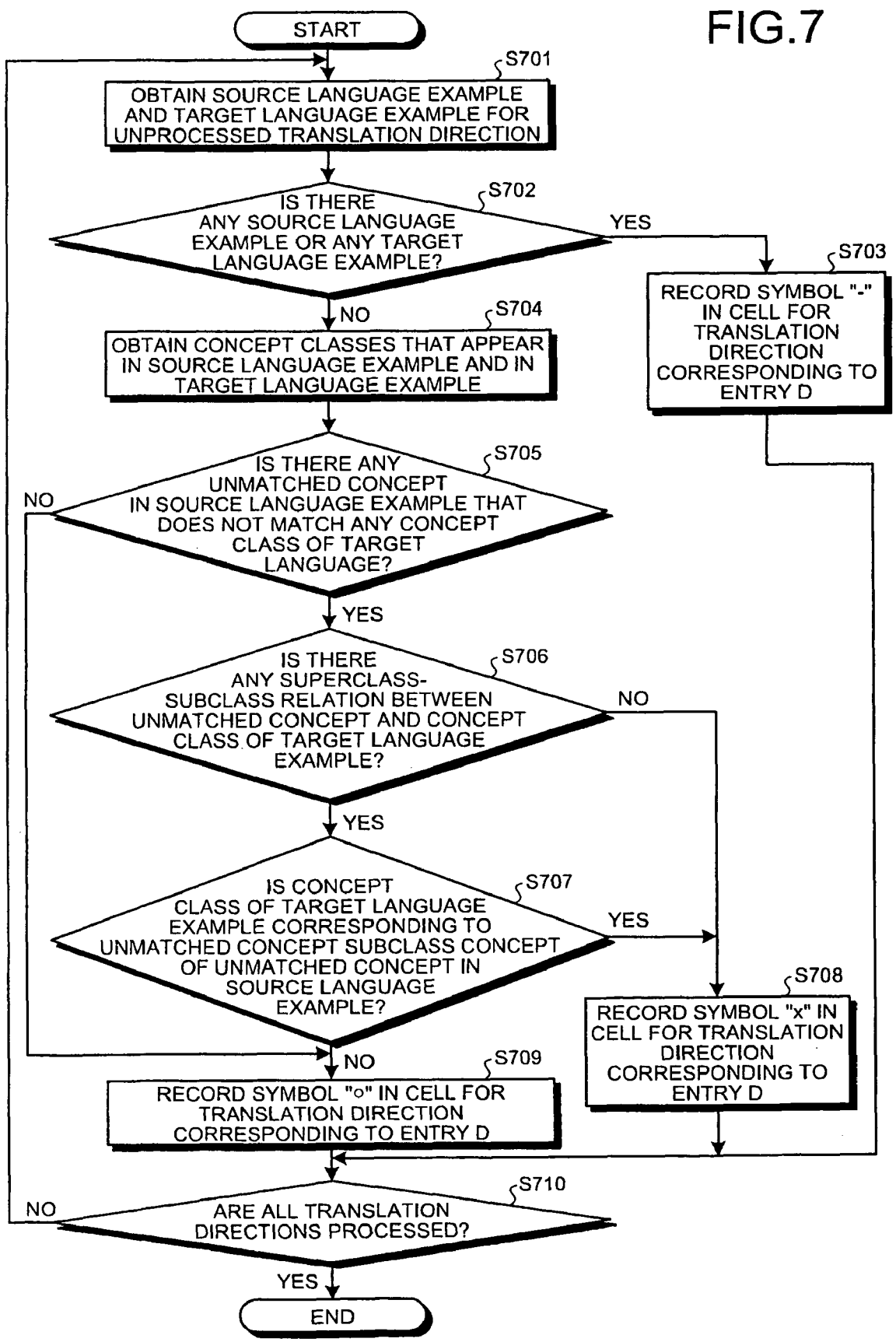
FIG. 7 is a flowchart of the machine translation process according to the first embodiment.

The applicability judging process at step S607 is now described in detail with reference to FIG. 7.

First, the judging unit 104 obtains a source language example and a target language example from an unprocessed translation direction from the example set E (step S701). Then, the judging unit 104 determines whether at least either one of a source language example or a target language example is unavailable (step S702).

When at least either one of the source language example or the target language example is unavailable (YES at step S702), the judging unit 104 enters the symbol "-" in the cell for the corresponding translation direction of the entry D (step S703).

If the case is not at least either one of the source language example or the target language example being unavailable (NO at step S702), the judging unit 104 obtains concept classes of the source language example and of the target language example (step S704).

Next, the judging unit 104 determines whether the concept classes of the source language example includes any unmatched concept that does not match the concept classes of the target language example (step S705). If there is any unmatched concept (YES at step S705), the judging unit 104 further determines whether there are superclass-subclass relations between the unmatched concept and each of the concept classes of the target language example (step S706). In this determination, the judging unit 104 refers to the subclass concept ID list stored in the thesaurus storage unit 122.

When there are superclass-subclass relations (YES at step S706), the judging unit 104 further determines whether the unmatched concept of the target language example is a subclass concept of the unmatched concept of the source language example (step S707).

When the unmatched concept of the target language example is a subclass concept of the unmatched concept of the source language example (YES at step S707), the judging unit 104 enters the symbol "x" in the cell of the corresponding translation direction of the entry D (step S708).

When the unmatched concept of the target language example is not a subclass concept of the unmatched concept of the source language example, or in other words, when the unmatched concept of the target language example is a superclass concept (NO at step S707), the judging unit 104 enters the symbol "o" in the cell of the corresponding translation direction of the entry D (step S709).

In addition, when it is determined at step S705 that there is no unmatched concept (NO at step S705), the judging unit 104 enters the symbol "o" in the cell of the corresponding translation direction of the entry D (step S709).

Furthermore, when it is determined at step S706 that there are no superclass-subclass relations between the unmatched concept and the concept class of each target language example (NO at step S706), the judging unit 104 enters the symbol "x" in the cell of the corresponding translation direction of the entry D (step S708).

To put it differently, the criterion of judgment at step S706 is that the example set is determined as not applicable if there is an unmatched concept class between the source and target languages and the number of concept classes increases in the translation direction. When the applicability of the example is limited to a certain situation in accordance with such a judgment criterion because the number of concept classes increases in the translation direction, the translation to the language for which the situation is limited can be controlled.

Next, the judging unit 104 determines whether all the translation directions are subjected to the processing (step S710). If the process is not completed (NO at step S710), the process is repeated on the next translation direction (step S701). If the process on all the translation directions is completed (YES at step S710), the applicability information setting process is terminated.

The judgment criteria used at steps S705, S706, and S707 is presented as an example, and any criteria can be adopted as long as concept classes can be suitably compared to determine which example sets are applicable. For example, the process may be configured to include at least one of the judgment criteria at those steps. Moreover, the process may be configured to include two or more of the judgment criteria.

Furthermore, according to the flowchart of FIG. 7A, a determination is made for each translation direction, but the process may be configured to judge the relationship of the concept classes for each pair of languages and set applicability information for the cross translation direction. In this manner, when an example in a target language, for example, English, includes a subclass concept class of a Japanese example, "x" is entered for the translation direction of "Japanese to English", whereas "o" is entered for the translation direction of "English to Japanese" at the same time.

Figure 8:
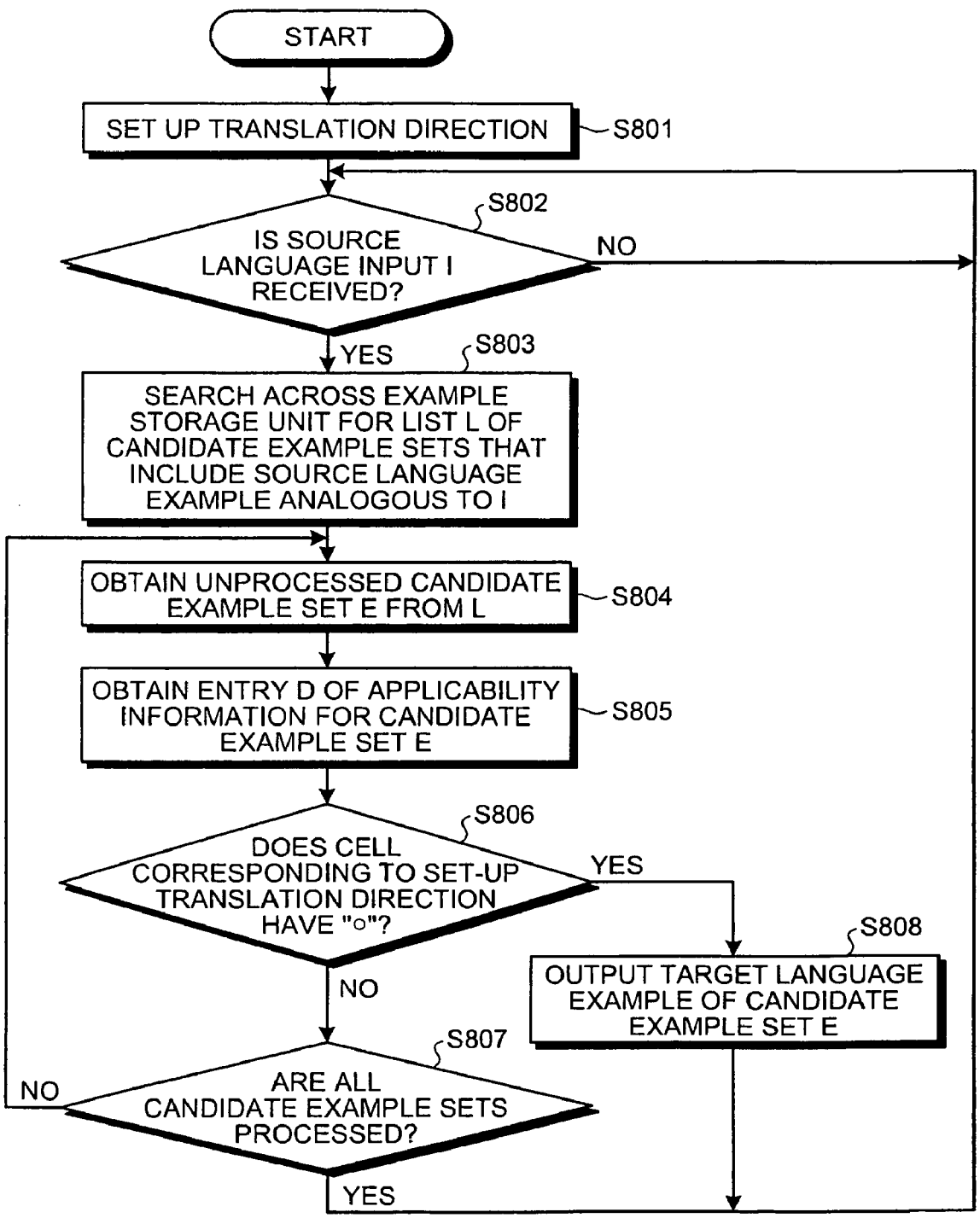
FIG. 8 is a flowchart of the machine translation process according to the first embodiment.

Next, the machine translation process is explained with reference to FIG. 8.

First, the receiving unit 101 sets up a translation direction in accordance with the input data received from the user (step S801). The translation direction does not have to be determined in this method. A specific translation direction may be set up in advance, or any other method can be adopted.

Next, the receiving unit 101 determines whether an input sentence in the source language (hereinafter, "source language input I") is received (step S802). If a source language input I is not received (NO at step S802), the process is repeated until it is received.

When a source language input I is received (YES at step S802), the example set searching unit 102 searches across the example storage unit 121 for a list L of candidate example sets including source language examples that match or are analogous to the source language input I (step S803).

Then, the example set searching unit 102 obtains an unprocessed candidate example set E from the list L (step S804). Thereafter, the example set searching unit 102 obtains the entry D having applicability information that corresponds to the candidate example set E (step S805).

Next, the example set searching unit 102 determines whether "o" is entered in the cell of the entry D that corresponds to the translation direction set at step S801 (step S806). When "o" is entered (YES at step S806), the output controlling unit 105 outputs the target language example of the candidate example set E as a translation result (step S808).

When "o" is not entered in the corresponding cell of the entry D (NO at step S806), it is determined that the candidate example set E is not applicable. In other words, the output controlling unit 105 removes the candidate example set E from the list L of candidate example sets. Next, the example set searching unit 102 determines whether all the candidate example sets on the list L are subjected to the processing (step S807).

When there is any candidate example set that is not yet subjected to the processing (NO at step S807), the example set searching unit 102 obtains the next unprocessed candidate example set to repeat the processing (step S804). When all the candidate example sets are subjected to the processing (YES at step S807), the machine translation process is terminated.

When the concept classes are compared in terms of the superclass-subclass relationship, the relationship within a predetermined range may be ignored. In addition, when the concept classes are compared to find a match, a semantic distance may be incorporated to indicate how similar the concept classes are so that it can be determined that the concept classes do not match when the distance is greater than a predetermined threshold value.

In the stochastic machine translation, the learning process of the stochastic machine translation may be conducted by referring to the applicability information and focusing on applicable example sets only. Furthermore, specific categories of words such as adverbs and personal pronouns may be excluded from comparison of concept classes for each translation direction. Still further, when example sets that are to be output are selected from candidate example sets, a certain number of sets may be selected in order of decreasing scores such as degree of similarity.

Next, the processes performed by the machine translation apparatus 100 according to the embodiment are explained below by giving specific examples. A specific example of the applicability information setting process is explained first. It is assumed here that information as shown in FIG. 2 is stored in advance in the example storage unit 121, and that information as shown in FIG. 3 is stored in advance in the thesaurus storage unit 122. Example analysis information has not yet been stored in the concept obtaining unit 103. Regarding the translation direction, it is assumed that the source language is Japanese and the target language is English.

In the applicability information setting process, although all the example sets stored in the example storage unit 121 are subjected to the processing, typical examples of the example set processing are discussed here, and the operations of the process are explained in detail.

First, the applicability information setting process performed on the example set of the entry at address a4 (hereinafter, "example set E4") as indicated in FIG. 2 is discussed.

After the example set E4 is obtained at step S601, an entry as indicated at address c4 in FIG. 4 (hereinafter, "entry c4") is generated as a new entry of the example analysis information for the example set E4 (step S602).

The Japanese example J (hereinafter, "Japanese example J4") and the English example E "My son had nosebleed this morning." (hereinafter, "English example E4") included in the example set E4 are both not yet processed, and thus the Japanese example J4 is first extracted (step S603).

The Japanese example J of the example set E4, from which the subject of the sentence is omitted, implies that somebody had nosebleed this morning. On the other hand, the English example E of the example set E4 represents that the son had nosebleed this morning. Thus, the translation from English to Japanese may not always be wrong, but the translation from Japanese to English is incorrect in the situation where the subject of the action is not the son.

Next, the thesaurus storage unit 122 as indicated in FIG. 3 is referred to so that words 207 and 208 that appear in the Japanese example J4 are matched to the entry at address b1 (word 301) and the entry at address b2 (word 304) in the thesaurus storage unit 122. Then, information that the words 207 and 208 belong to the concept classes "time" and "physiological phenomenon", respectively, is extracted and recorded in the cell of the Japanese example concept class list J for the entry c4 (step S604).

Because the example set E4 includes an unprocessed English example E4, (NO at step S605), this English example E4 is extracted (step S603), on which a similar process is performed. In this process, concept classes "person", "physiological phenomenon", and "time" are extracted from the words "son", "nosebleed", and "morning" that appear in the English example E4, based on the entries at addresses b3, b2, and b1 of the thesaurus storage unit 122. Then, the extracted concept classes are recorded in the cell of the English example concept class list E for the entry c4 (step S604).

Because all the examples in the example set E4 are now processed (YES at step S605), the judging unit 104 produces an entry (hereinafter, "entry d4") at address d4 in FIG. 5 as a new item of applicability information for the example set E4 (step S606).

Next, applicability of the example set E4 is judged for each translation direction in the applicability judging process, and the results are added to the entry d4, as indicated in FIG. 5 (step S607).

More specifically, because the example set E4 includes a Japanese example and an English example only, the symbol "-" is entered for any translation directions involving Chinese, i.e. Japanese to Chinese, English to Chinese, Chinese to Japanese, and Chinese to English (step S703).

Furthermore, the Japanese example concept class list J for the entry c4 indicates "time, physiological phenomenon", and the English example concept class list E for the entry c4 indicates "person, physiological phenomenon, time". It is therefore determined that there is an unmatched concept "person" (YES at step S705). Because the concept class "person" that has no superclass-subclass relations with the concept class in the source language is included, the symbol "x" is recorded in the cell of the translation direction of "Japanese to English" (NO at step S706, step S708).

With the similar process to the above, the symbol "o" is recorded in the cell of the translation direction of English to Japanese (step S709). As a result, the applicability information setting process is completed in relation to the example set E4. According to this embodiment, the applicability information can be set up in such a manner as to avoid the use of the example set E4 only in the translation direction of Japanese to English in which erroneous translation could happen.

Next, the applicability information setting process performed on an example set of an entry at address a6 (hereinafter, "example set E6") as shown in FIG. 2 is discussed.

After the example set E6 is obtained at step S601, an entry at address c6 (hereinafter, "entry c6") as shown in FIG. 4 is newly produced as a new example analysis information entry for the example set E6 (step S602).

In accordance with the process discussed above, a list of concept classes are extracted for a Japanese example J, an English example E "10 yuan for each car per hour.", and a Chinese example C that are included in the example set E6. In particular, "time, currency", "currency, time, means of transportation", and "means of transportation, time, currency" are extracted, respectively. The extracted concept classes are entered in the corresponding cells of the Japanese example concept class list J, the English example concept class list E, and the Chinese example concept class list C of the entry c6, as shown in FIG. 4.

The Japanese example J of the example set E6 has no object of the sentence, meaning that the rate per hour for something undefined is 10 yuan. On the other hand, the English example E and the Chinese example C of the example set E6 both indicate that the hourly rate for a car is 10 yuan. Thus, the translation from English or Chinese to Japanese may not be wrong, but the translation from Japanese to English or to Chinese is incorrect when the object of the sentence is not a car.

Thereafter, an entry (hereinafter, "entry d6") is produced by the judging unit 104 at address d6 of FIG. 5 as a new applicability information item of the example set E6 (step S606).

Next in the applicability judging process, the applicability is judged for individual translation directions of the example set E6, and the results are added to the entry d6 as shown in FIG. 5 (step S607).

In particular, because the example set E6 includes all Japanese, English, and Chinese examples, no symbol "-" is entered at step S703.

On the other hand, in the entry c6, which corresponds to the example set E6, the English example concept class list E and the Chinese example concept class list C include a concept class "means of transportation", which does not appear in the Japanese example concept class list J. In addition, there is no concept class in the Japanese example concept class list J that has superclass-subclass relations with this concept class. Thus, the symbol "x" is entered in the cells for the translation directions of Japanese to English and Japanese to Chinese of the entry d6 (YES at step S706, step S708).

In the similar process, the symbol "o" is entered in the cells for the translation directions of English to Japanese, English to Chinese, Chinese to Japanese, and Chinese to English (step S709). The applicability information setting process is thereby completed in relation to the example set E6. According to the embodiment, the applicability information can be set in such a manner as to avoid the use of the example set E6 only in the translation directions of Japanese to English and Japanese to Chinese, in which a mistranslation may occur.

The applicability information setting process performed on an example set in the entry at address a5 (hereinafter, "example set E5") in FIG. 2 is now explained.

After the example set E5 is obtained at step S601, an entry (hereinafter, entry c5) is produced at address c5 as shown in FIG. 4 as a new example analysis information item for the example set E5 (step S602).

In relation to the Japanese example J and the English example E "How much does it cost to rent a racket?" of the example set E5, the lists of concept classes are extracted in accordance with a process similar to the above. More specifically, "tool, currency" and "currency, sports equipment" are extracted, respectively. These concept classes are recorded in the cells for the Japanese example concept class list J, and the English example concept class list E of the entry c5 in FIG. 4.

In the Japanese example J of the example set E5, the rental rate of some kind of tool is asked. On the other hand, the English example E of the example set E5 is an inquiry about the rental rate of a specific tool, a racket. Thus, the translation from English to Japanese may not be wrong, but the translation from Japanese to English is incorrect when the tool is not a racket.

Thereafter, the judging unit 104 produces a new entry at address d5 (hereinafter, entry d5) as an applicability information item for the example set E5, as shown in FIG. 5 (step S606).

Next, in the applicability judging process, the applicability of the example set E5 is judged for each of the translation directions, and the results are added to the entry d5 as indicated in FIG. 5 (step S607).

In other words, the example set E5 includes only Japanese and English examples, and thus the symbol "-" is entered in the cells for the translation directions of Japanese to Chinese, English to Chinese, Chinese to Japanese, and Chinese to English (step S703).

Next, in the entry c5 corresponding to the example set E5, unmatched concept classes, "tool" and "sports equipment", are detected between the contents of the Japanese example concept class list J and the English example concept class list E (YES at step S705). Furthermore, the entry of the address b7 (hereinafter, entry b7) that corresponds to the concept class "tool", and the entry of the address b8 (hereinafter, entry b8) that corresponds to the concept class "sports equipment" are obtained from the thesaurus storage unit 122 shown in FIG. 3.

It is determined that the concept class "sports equipment" is a subclass concept of the concept class "tool" because the subclass concept ID list of the entry b7 includes a value b8 that indicates the entry b8. Hence, the symbol "x" is recorded in the cell for the translation direction of Japanese to English of the entry d5 in accordance with the judgment criteria adopted at step S707 (NO at step S707, step S708).

In the similar process, the symbol "o" is recorded in the cell for the translation direction of English to Japanese (step S709). As a result, the applicability information setting process is completed in relation to the example set E5. According to the method of the present embodiment, the applicability information can be set up in such a manner as to avoid the use of the example set E5 only in the translation direction of Japanese to English in which mistranslation may occur.

Next, a specific example of the machine translation process is explained.

First, it is assumed that the translation direction is set up, with the source language being English and the target language being Japanese (step S801). Next, the source language input I in English "My son had a nosebleed this morning." (hereinafter, "English input 1") is received (YES at step S802).

Then, the example set searching unit 102 searches across the example storage unit 121 to find the example set E4 having an English example that matches the English input 1, and the entry at the address a4 (hereinafter, entry a4) is obtained (step S803).

Next, the entry d4, which is the applicability information of the example set E4, is obtained (step S805). Because the cell for English to Japanese of the entry d4 has "o", the example set E4 in the translation direction of English to Japanese is determined as applicable (YES at step S806). Then, the output controlling unit 105 outputs the Japanese example of the example set E4 as a translation result (step S808).

The output Japanese example does not include a word that is equivalent to the word "son" included in the English example under the concept class "person". In Japanese, however, the subject of a sentence is often allowed to be omitted, and thus the naturalness and reliability of the translation result of this input is maintained.

On the contrary, it is assumed that the translation direction is determined at step S801 as the source language being Japanese and the target language being English, and that the source language input I in Japanese (hereinafter, Japanese input 1) the same as Japanese example J at address a4 of the FIG. 2 is input. Because the cell for Japanese to English of the entry d4 shows "x", the example set E4 is not used in the translation direction of Japanese to English (NO at step S806).

The above function avoids mistranslation that could be caused by adopting the English example that includes the word "son" under the concept "person", which is not included in the Japanese input 1.

With this function, the applicability of the example set E6 is judged for each translation direction even when a sentence that matches an example of a language included in the example set E6 or a similar sentence is input. Mistranslation can be thereby avoided.

In other words, when the input sentence that matches the Japanese example J included in the entry at address a6 (hereinafter, entry a6) in FIG. 2 is to be translated into English or Chinese, the example set E6 can be determined as not applicable, by referring to the content of the entry d6. For this reason, the situation can be avoided where the English example E including, for example, a phrase "for each car" is selected although the Japanese example J does not contain an equivalent phrase, an erroneous translation that does not suit the situation of utterance is output.

On the other hand, when the English example E "10 yuan for each car per hour." included in the entry a6 or any sentence that matches the Chinese example C is to be translated to another language, the use of the example set E6 is not limited.

In the same manner, when a sentence that matches the examples of the example set E5 or a similar sentence is input, the applicability of the example set E5 is judged for each translation direction. Erroneous translations can be thereby avoided.

More specifically, when a sentence that matches the Japanese example J included in the entry at address a5 (hereinafter, entry a5) in FIG. 2 is input, it is determined by referring to the content of the entry d5 that the example set E5 is not applicable. In this manner, a situation can be avoided where the English example E asking for the rate of renting a racket is selected although the Japanese example J does not state that the tool is a racket, and an erroneous translation output that does not suit the utterance is output.

On the other hand, when a sentence that matches the English example E "How much does it cost to rent a racket?" of the entry a5 is input, the application of the example set E5 is not limited.

The machine translation apparatus according to the first embodiment compares the concept classes of the examples in different languages, and, when the examples do not match, the device determines the applicability of the examples in accordance with the translation direction based on the relationship of the concept classes. Thus, only applicable examples can be used. For this reason, corpus-based machine translation can be conducted without losing reliability or naturalness of the sentence.

In the above description, the applicability of the example set is simply limited in the translation direction where the number of concept classes increases. However, the structure may be configured in such a manner that a new example set is created by removing the phrase corresponding to any concept class that is not included in the source language example. This process enables the translation to be performed even in the originally limited translation direction. The process may be executed as part of the applicability information setting process at the beginning, or as part of the machine translation process.

Figure 9:
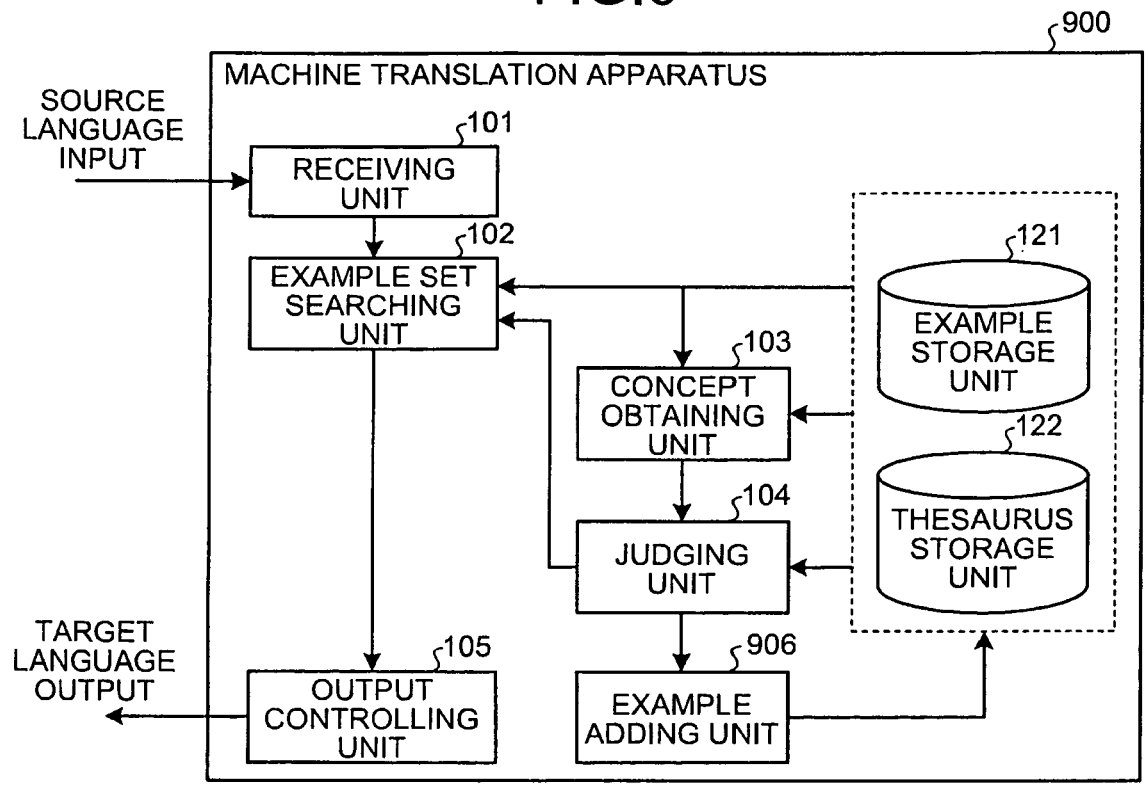
FIG. 9 is a block diagram of the structure of a machine translation apparatus according to a modification of the first embodiment.

In FIG. 9, a machine translation apparatus 900 includes the example storage unit 121, the thesaurus storage unit 122, the receiving unit 101, the example set searching unit 102, the concept obtaining unit 103, the judging unit 104, an example adding unit 906, and the output controlling unit 105.

This modification example is different from the first embodiment in that the example adding unit 906 is added. The example adding unit 906 adds an example set that is newly created from an example set determined as being inapplicable, into the example storage unit 121.

According to the above method, for example, because the Japanese example J of the entry a6 in FIG. 2 does not include the concept class "means of transportation", this example set is not adopted for the translation from Japanese to English or Chinese.

In contrast, the example adding unit 906 according to this modification example, removes the phrase "for each car" corresponding to the concept class "means of transportation" from the English example E to obtain a new example "10 yuan per hour." Then, the example adding unit 906 adds this example to the example storage unit 121, and sets the applicability information for the translation direction of Japanese to English to "o". In this manner, the translation can be realized in the direction of Japanese to English that is limited with the method according to the first embodiment.

Furthermore, when there are superclass-subclass relations between the concept classes, the application of the example set is limited in the translation direction where the concept becomes more detailed (i.e. direction of a superclass concept to a subclass concept) according to the first embodiment. In contrast, the structure may be configured in such a manner that an example set is created by replacing the phrase corresponding to the lower concept class with a phrase corresponding to the higher concept class so that the translation can be realized in this direction.

For example, the entry a5 in FIG. 2 is not used for the Japanese to English translation in the method according to the first embodiment because the concept class "sports equipment" in the English example E "How much does it cost to rent a racket?" is a subclass concept of the concept class "tool" in the Japanese example J.

In contrast, the example adding unit 906 according to the modification example creates an example set by replacing the word "racket" corresponding to the concept class "sports equipment" in the English example E with a word "tool" corresponding to the superclass concept. Then, the example adding unit 906 adds this example set to the example storage unit 121, and defines the applicability information for the translation direction of Japanese to English as "o". In this manner, the translation in the translation direction of Japanese to English that is restrained according to the first embodiment is realized.

The corpus-based translation has a drawback of being unable to translate all the input sentences because the sentences are infinitely variable. The translatable sentences are limited due to the principle of its translation system. To overcome this drawback, when there is any difference between a sentence of a source language and a source language example of any example set stored in the corpus, the different portion is replaced with a suitable phrase by referring to a multilingual dictionary or the like. The result of the translation is thereby obtained. In particular, a portion different from that of the target language of the example set is replaced with a translated word or phrase obtained by referring to the multilingual dictionary or the like so that a correct translation result can be attained even if the input sentence includes a portion different from any sentence in the corpus. Such a technique is called a translation editing function hereinafter.

On the other hand, when an example set including a fable-based phrase, an idiom, or a fixed phrase is to be dealt with, the translation editing function according to the conventional technologies sometimes performs mistranslation by editing the phrase that should not be replaced.

A machine translation apparatus according to a second embodiment compares the concept classes of phrases included in the examples of the different languages, and inhibits the translation editing function when the ratio of the difference is equal to or smaller than a predetermined value.

Figure 10:
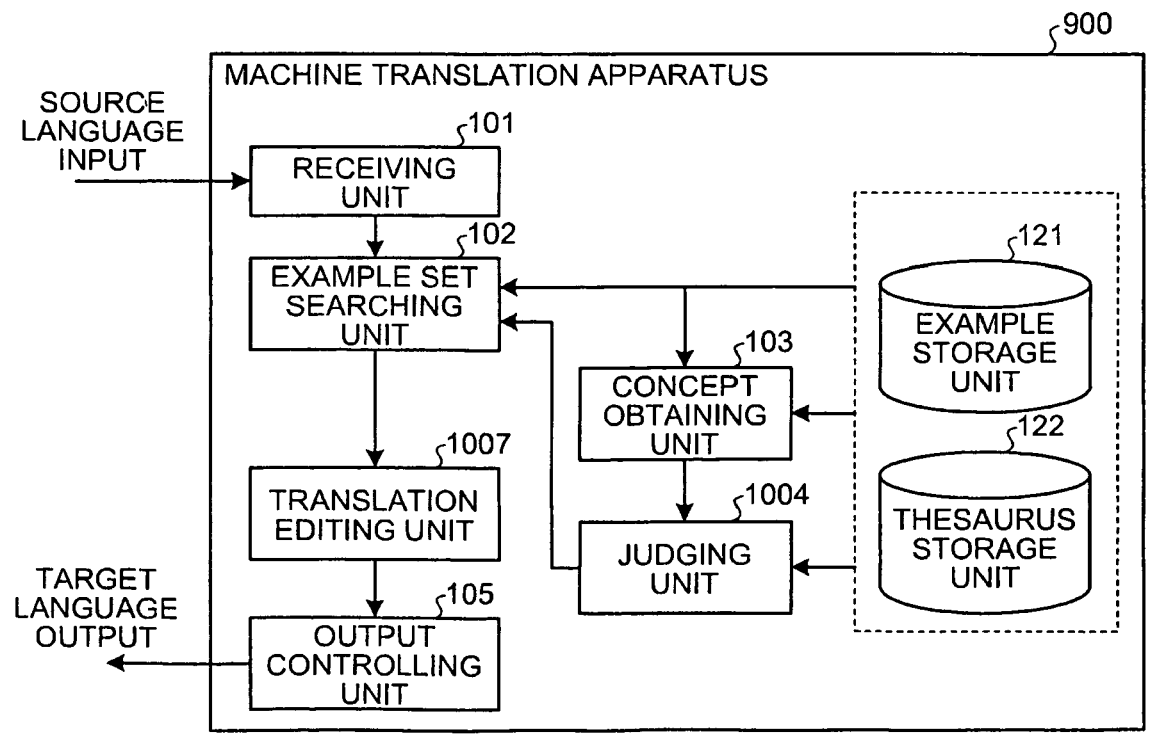
FIG. 10 is a block diagram of the structure of a machine translation apparatus according to a second embodiment.

In FIG. 10, a machine translation apparatus 1000 includes the example storage unit 121, the thesaurus storage unit 122, the receiving unit 101, the example set searching unit 102, the concept obtaining unit 103, a judging unit 1004, a translation editing unit 1007, and the output controlling unit 105.

The second embodiment differs from the first embodiment in that the translation editing unit 1007 is added and the function of the judging unit 1004 is changed. The rest of the structure and the function is the same as the machine translation apparatus 100 according to the first embodiment as shown in the block diagram of FIG. 1. Therefore, the same reference numerals are assigned to the same structural elements and the explanation thereof is omitted.

The judging unit 1004 is different from the judging unit 104 according to the first embodiment in that a function of determining whether the translation should be edited based on the ratio of concept classes included in the examples of different languages in the example sets.

More specifically, the judging unit 1004 determines whether the ratio of the unmatched concepts to the concept classes included in the source language example or the target language example is greater than a predetermined threshold value. When it is greater, the judging unit 1004 determines that the translation cannot be edited. This means that the example set is determined as including a freely translated example such as a fable-based phrase if the ratio of unmatched concept classes is large, and thus the translation should not be edited.

The judging unit 1004 maintains applicability information to which the result of judging whether the translation should be edited is added. As indicated in FIG. 11, a column for judgment as to whether the translation should be edited is included according to this embodiment. In the translation editing column, the symbol "o" is recorded when the translation can be edited, but the symbol "x" is recorded when the translation should not be edited.

The translation editing unit 1007 edits the target language example of the example set that the example set searching unit 102 obtains from the example storage unit 121 in response to the sentence input in the source language, based on the difference between the source language input and the source language example of the example set, and creates a translation sentence of the source language input.

The process performed by the translation editing unit 1007 can be realized in the same manner as the conventional example based machine translation process, which uses alignments showing the correspondence between words in a source language input and a source language example of an example set or differences therebetween, alignments or differences between the source language example and the target language example of the example set, and a dictionary for source language words to target language words.

In addition, the translation editing unit 1007 refers to the translation editing column of the applicability information corresponding to the obtained example set during the machine translation process. When the value indicates "x", the translation editing function is not used.

Figure 12:
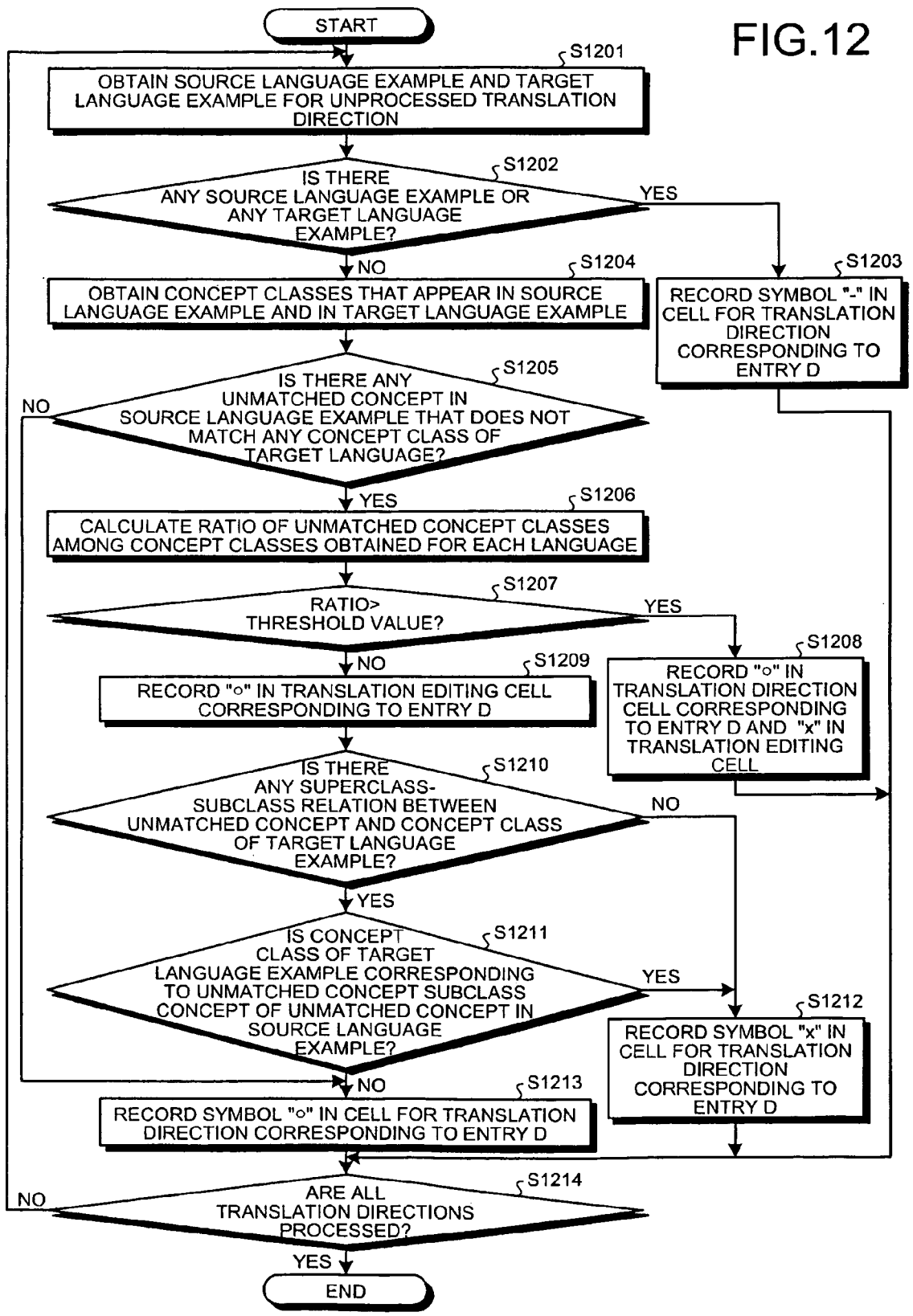
FIG. 12 is a flowchart of an applicability judging process according to the second embodiment.

Next, the applicability judging process performed by the machine translation apparatus 1000 according to the second embodiment is explained with reference to FIG. 12. The entire flow of the applicability information setting process is the same as FIG. 6, and thus the explanation is omitted.

The processes of determining whether an example is available, obtaining concept classes, and determining unmatched concepts at steps S1201 through S1205 are the same as the processes at steps S701 through S705 performed by the machine translation apparatus 100 according to the first embodiment, and thus the explanation thereof is omitted.

When there is an unmatched concept (YES at step S1205), the judging unit 1004 calculates the ratio of the unmatched concepts to the concept classes in the source language example or the target language example (step S1206).

Next, the judging unit 1004 determines whether the ratio is greater than the predetermined threshold value (step S1207). When it is greater (YES at step S1207), the symbol "o" is entered in the cell for the corresponding translation direction of the entry D, and the symbol "x" is entered in the cell of the translation editing column (step S1208).

When the ratio is not greater than the predetermined threshold value (NO at step S1207), the judging unit 1004 enters the symbol "o" in the corresponding cell of the translation editing column of the entry D (step S1209). If this is the case, a value is entered in the cell for the translation direction in accordance with the subsequent processes at steps S1210 through S1213.

The processes at steps S1210 through S1214 are the same as the processes performed at steps S706 through S710 by the machine translation apparatus 100 according to the first embodiment, and thus the explanation thereof is omitted.

Figure 13:
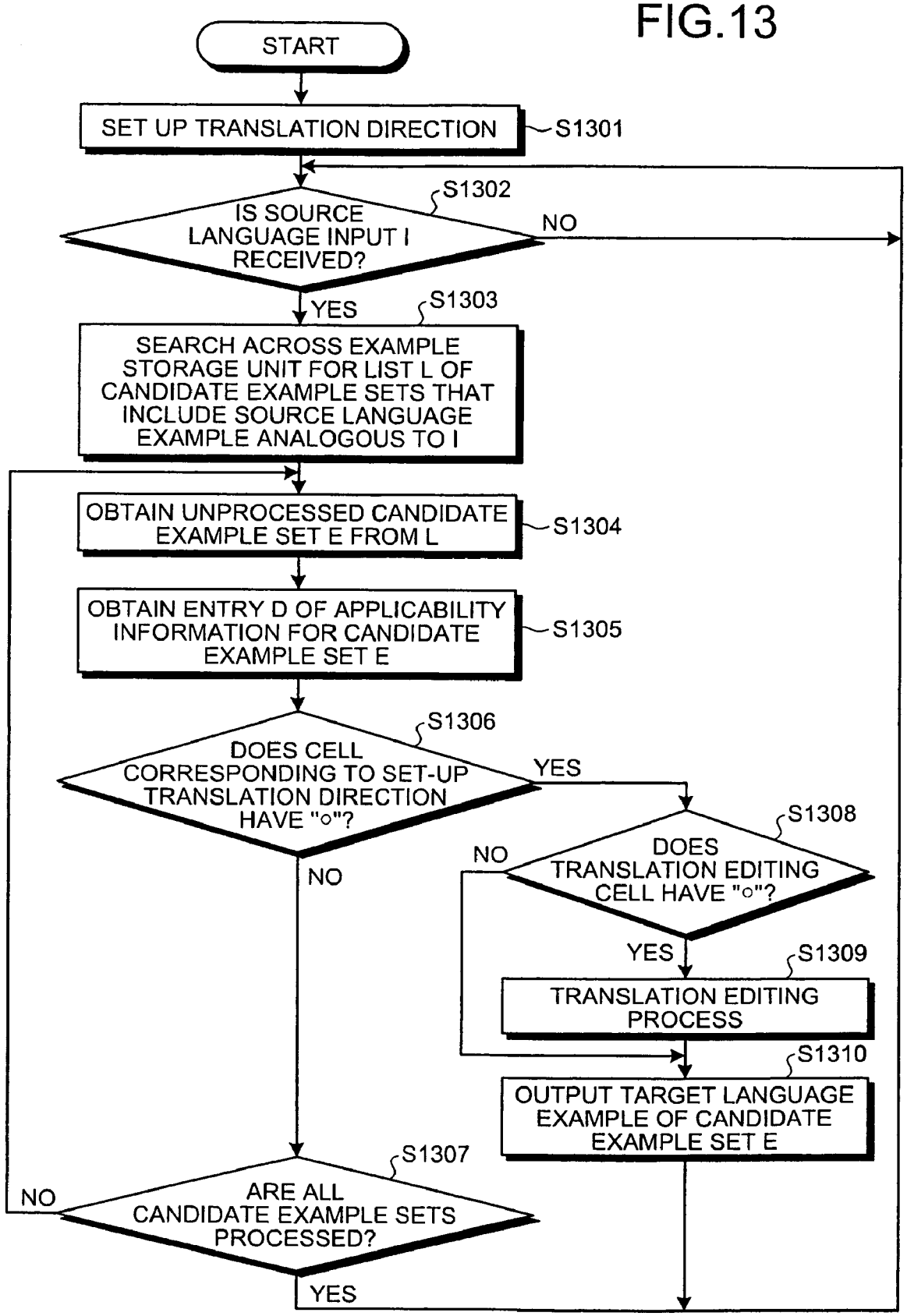
FIG. 13 is a flowchart of the machine translation process according to the second embodiment.

The machine translation process performed by the machine translation apparatus 1000 according to the second embodiment is explained with reference to FIG. 13.

The processes of receiving an input sentence, searching for an example set, judging the applicability information, and judging the completion of the process at steps S1301 through S1307 are the same as the processes performed at steps S801 through S807 by the machine translation apparatus 100 according to the first embodiment, and thus the explanation thereof is omitted.

When "o" is entered in the cell corresponding to the translation direction for which applicability information is set (YES at step S1306), the translation editing unit 1007 determines whether "o" is entered in the cell of the translation editing column (step S1308).

When "o" is entered in the cell of the translation editing column (YES at step S1308), the translation editing unit 1007 executes the translation editing process (step S1309). If the received source language input I matches the source language example, the translation editing process does not need to be executed.

After the translation editing process, or when it is determined at step S1308 that "o" is not entered in the cell of the translation editing column (NO at step S1308), the output controlling unit 105 outputs the target language example of the candidate example set E as a translation result (step S1310).

Next, specific examples of the processes performed by the machine translation apparatus 1000 according to the embodiment are explained. First, a specific example of the applicability information setting process is discussed.

It is assumed that the example set of the entry at address a7 in FIG. 2 (hereinafter, "entry a7") is entered as an example set containing a fable-based phrase (hereinafter, "example set E7"). In the applicability information setting process, an entry at address c7 in FIG. 4 (hereinafter, "entry c7") is created in relation to the example set E7, and an entry at address d7 in FIG. 5 (hereinafter, "entry d7") is also created.

The Chinese example C of the example set E7 is known as a fable-based phrase. On the other hand, the Japanese example J of the example set E7 is a sentence freely translated from this fable-based phrase. The translation from Chinese to Japanese therefore may not be wrong. On the other hand, when a different sentence that is also translated from the same fable-based phrase is input, there is a possibility that edits may be made to the Chinese fable-based phrase, which is not supposed to be edited, by the translation editing function based on the differences between the Japanese sentence and the Japanese example J.

In this example, no concept class in the Japanese example concept class list J of the entry c7 in FIG. 4 matches any of the Chinese example concept class list C. Thus, it is determined that the translation editing function cannot be used (YES at step S1207), as a result of which the symbol "x" is entered in the translation editing cell of the entry d7 (step S1208).

Next, a specific example of avoiding mistranslation by not allowing the translation to be edited is explained with reference to FIG. 14.

For example, a Japanese sentence 1401 is input as a source language input I in the machine translation process. This Japanese sentence 1401 differs from the Japanese example J at address a7 in FIG. 2 only in two words. The conventional example based machine translation often executes a translation editing process to make up for the difference.

Figure 14:
FIG. 14 is a diagram for explaining various types of information dealt with in a specific example.

It is assumed here that, for example, alignments 1402 to 1405 as shown in FIG. 14 are created based on the matches of the sentence structures between the Japanese example J and the Chinese example C of the example set E7. The symbol "/" used in the alignments 1402 to 1405 represents a Japanese phrase on the left side of the symbol and a Chinese phrase on the right side, the two phrases being associated with each other.

Japanese words 1406 and 1407 that are obtained as differences between the Japanese sentence 1401 and the Japanese example J correspond to Chinese words 1408 and 1409, respectively, in FIG. 14. Thus, with the conventional technologies, the words 1410 and 1411 in the Chinese example C of the example set E7 in FIG. 14 could be replaced with the words 1408 and 1409, ending up with a Chinese translation 1412.

In other words, because the Chinese example C includes a fable-based phrase, mistranslation may be caused if the translation editing function is adopted according to the conventional technologies. On the other hand, whether the translation editing should be performed is suitably judged based on the semantic similarity between the examples of an example set according to the second embodiment. Hence, an input sentence can be prevented from being mistranslated.

In a machine translation apparatus according to a third embodiment, the example storage unit 121 is configured in a manner that new example sets can be entered and that the applicability of an example set is judged at the time of entering the example set to present the judgment result to the user.

Figure 15:
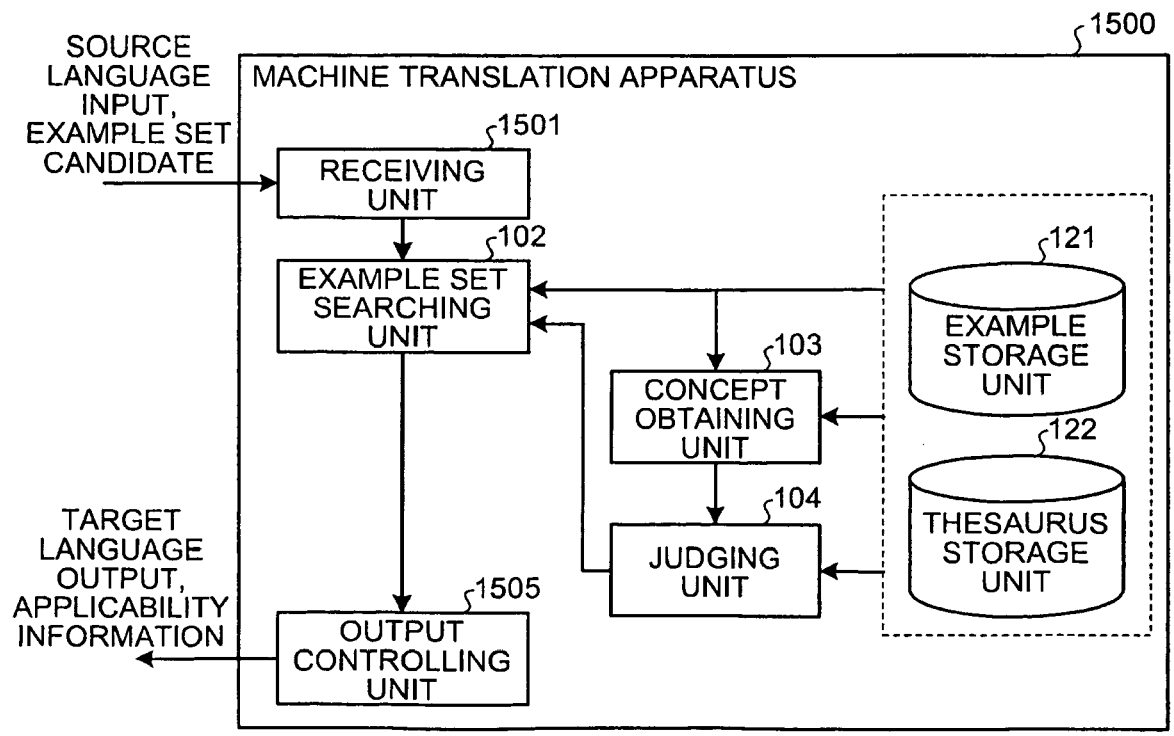
FIG. 15 is a block diagram of the machine translation apparatus according to the third embodiment.

As illustrated in FIG. 15, a machine translation apparatus 1500 includes the example storage unit 121, the thesaurus storage unit 122, a receiving unit 1501, the example set searching unit 102, the concept obtaining unit 103, the judging unit 104, and an output controlling unit 1505.

The third embodiment is different from the first embodiment in the functions of the receiving unit 1501 and the output controlling unit 1505. The rest of the structure and functions of the machine translation apparatus 1500 is the same as the machine translation apparatus 100 according to the first embodiment as shown in the block diagram of FIG. 1. Thus, the same reference numerals are assigned to the same components, and the explanation thereof is omitted.

The receiving unit 1501 is different from the receiving unit 101 according to the first embodiment in that the receiving unit 1501 is configured to receive an input of a candidate example set to enter in the example storage unit 121, in addition to an input of a source language. The receiving unit 1501 may receive a text that is input from a keyboard or any other interface (not shown).

The output controlling unit 1505 is different from the output controlling unit 105 according to the first embodiment in that the output controlling unit 1505 is provided with a function of presenting the result of judging the applicability of a received candidate example set to the user.

Figure 16:
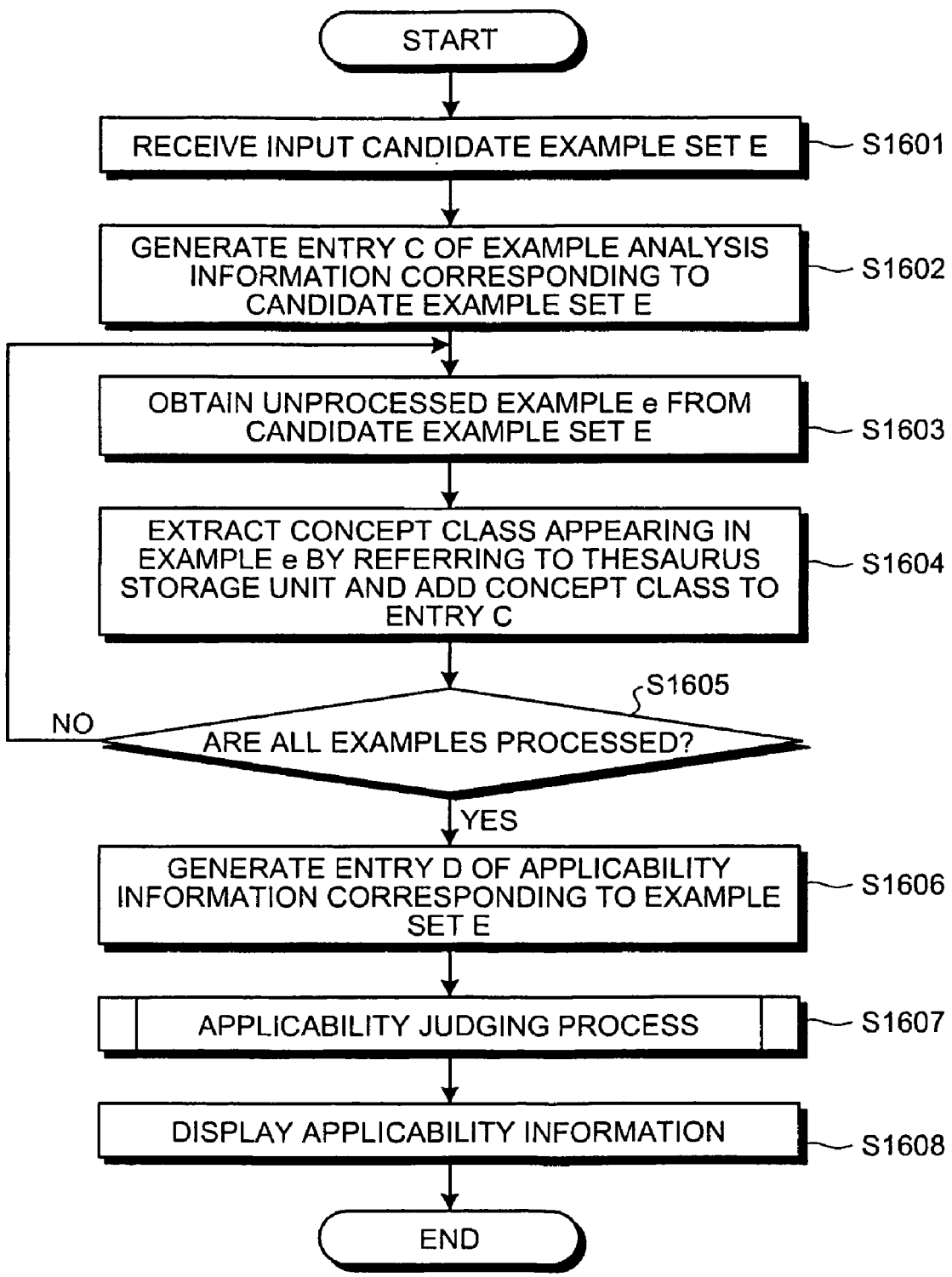
FIG. 16 is a flowchart of an applicability information presenting process according to the third embodiment.

Next, the applicability information presenting process performed by the machine translation apparatus 1500 according to the third embodiment is explained with reference to FIG. 16. The applicability information presenting process represents a process of judging the applicability of a received candidate example set and presenting the judgment result to the user.

First, the receiving unit 1501 receives a candidate example set input by the user (step S1601).

The entry producing process, the concept class extracting process, and the applicability judging process at steps S1602 through S1607 are the same as the processes performed at steps S602 through S607 by the machine translation apparatus 100 according to the first embodiment, and thus the explanation thereof is omitted.

After the applicability judging process, the output controlling unit 1505 presents the applicability information on a display device (not shown) (step S1608), and the applicability information presenting process is terminated.

Figure 17:
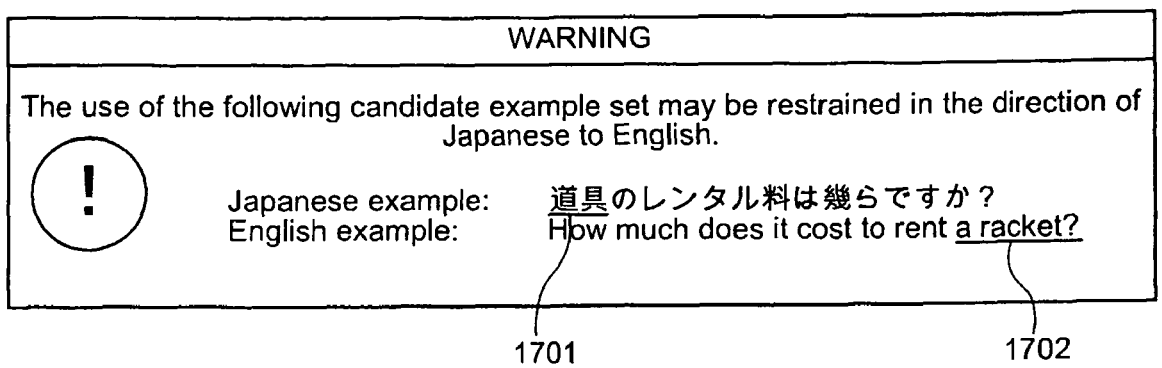
FIG. 17 is a diagram for showing an example of presentation of the applicability information.

As shown in FIG. 17, when the input example set is determined as inapplicable, a warning message is presented to indicate that the use of the example set may be controlled. In this drawing, underlines 1701 and 1702 are displayed to show the correspondence between the words based on which the use is determined to be controlled.

The machine translation apparatus according to the third embodiment informs the user who is making an entry in example sets as to in which translation direction the example set of the entry can be used or not. This calls the user's attention and gives the user a chance to modify the example set.

Figure 18:
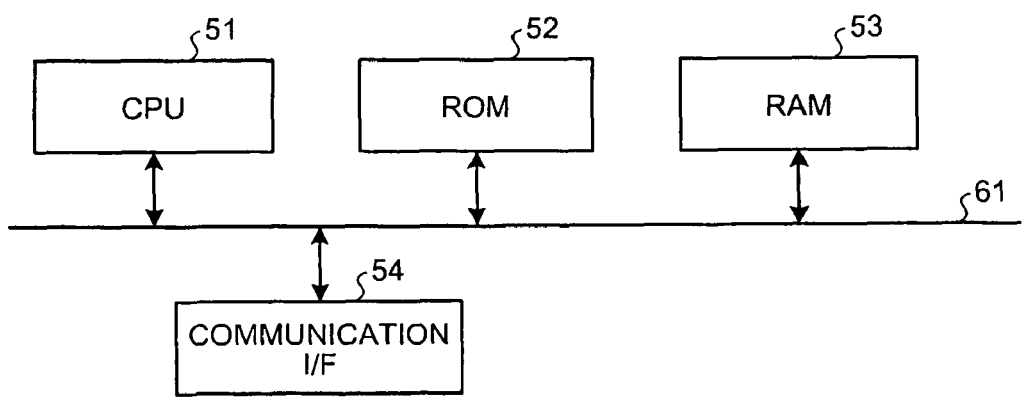
FIG. 18 is a diagram illustrating a hardware structure of the machine translation apparatus according to the first to third embodiments.

Next, the hardware structure of the machine translation apparatus according to any of the first to third embodiments is explained with reference to FIG. 18.

The machine translation apparatus according to any of the first to third embodiments includes a control device such as a central processing unit (CPU) 51, memory devices such as a read only memory (ROM) 52 and a RAM 53, a communication interface 54 that creates a connection to a network to perform communications, and a bus 61 connecting all these components.

A machine translation program executed by the machine translation apparatus according to any of the first to third embodiments is preloaded onto the ROM 52 or the like.

The machine translation program executed by the machine translation apparatus according to any of the first to third embodiments may be recorded on a computer-readable memory medium such as a compact disk read only memory (CD-ROM), a flexible disk (FD), a compact disk recordable (CD-R), and a digital versatile disk (DVD), as a file in an installable or executable form.

Furthermore, the machine translation program executed by the machine translation apparatus according to any of the first to third embodiments may be stored in a computer connected to a network such as the Internet so that the program can be downloaded by way of the network. Alternatively, the machine translation program executed by the machine translation apparatus according to any of the first to third embodiments may be offered or distributed by way of the network such as the Internet.

The machine translation program executed by the machine translation apparatus according to any of the first to third embodiments is formed as a module that includes the above units (the receiving unit, the example set searching unit, the concept obtaining unit, the judging unit, and the output controlling unit). As an actual hardware structure, the CPU 51 reads a machine translation program from the ROM 52 and executes the program. Then, all those units are loaded and generated on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine translation apparatus comprising:
an example storage unit that stores a plurality of example sets in which each example set includes at least a first plurality of words in a first language that form the first phrase and a second plurality of words in a second language that form a second phrase wherein the first and second phrases have possibly equivalent meanings;
a concept storage unit that stores a plurality of words in the first language, a plurality of words in the second language, and a plurality of concepts, each representing a meaning shared by words in the first language and second language;
a first concept obtaining unit that obtains first concepts from the concept storage unit, the first concepts each corresponding to a word included in a first phrase of at least one of the stored example sets;
a second concept obtaining unit that obtains second concepts from the concept storage unit, the second concepts each corresponding to a word included in the second phrase of said one of the stored example sets; wherein the second phrase corresponds to the first phrase in the example set;
a determining unit that determines whether there is any unmatched concept between the first concepts and the second concepts associated with said one of the stored example sets, and determines that said one of the stored example sets may not be applicable in at least one translation direction when there is the unmatched concept;
a receiving unit that receives an input sentence in the first language;
an example set searching unit that searches for any example sets that are analogous to or match the input sentence;
a deleting unit that deletes an example set that is determined as inapplicable from the example sets searched by the example set searching unit, based at least in part on whether or not the determining unit determined that there was an unmatched concept between the first and second concepts for that example set; and
an output controlling unit that outputs, as a translation result, an example in the second language included in the example sets not deleted by the deleting unit.

2. The apparatus according to claim 1, wherein the determining unit determines that an example set is not applicable in a translation direction from the first language to the second language, when there is an unmatched concept and when the unmatched concept is included in the second concepts only.

3. The apparatus according to claim 1, wherein the determining unit determines that an example set is applicable in a translation direction from the first language to the second language, when there is the unmatched concept and when the unmatched concept is included in the first concept only.

4. The apparatus according to claim 1, wherein the determining unit determines that the first concepts do not match the second concepts, when a semantic distance between a meaning of one of the first concepts and a meaning of a corresponding one of the second concepts is greater than a predetermined first threshold value.

5. The apparatus according to claim 1, wherein
the concept storage unit stores the words in the first language, the words in the second language, the concepts, and a subclass concept representing a meaning subclass to the concepts, in association with one another for each concept, and
the determining unit obtains the subclass concept corresponding to unmatched concept included in the first concepts from the concept storage unit, when there is an unmatched concept, and determines that the corresponding example set is not applicable in the translation direction from the first language to the second language, when the obtained subclass concept matches the unmatched concept included in the second concepts corresponding to that example set.

6. The apparatus according to claim 5, further comprising:
an adding unit that obtains from the concept storage unit the subclass concept corresponding to the unmatched concept included in the first concepts, and, when the obtained subclass concept matches the unmatched concept included in the second concepts, creates an example set including an example in the second language by replacing the unmatched concept with the concept superodinate to the subclass concept, and adds the example set to the example storage unit, wherein
the determining unit further determines that the added example set is applicable in the translation direction from the first language to the second language.

7. The apparatus according to claim 5, wherein the determining unit obtains from the concept storage unit the subclass concept corresponding to the unmatched concept included in the second concepts, when there is the unmatched concept, and determines that the example set is applicable in the translation direction from the first language to the second language, when the obtained subclass concept matches the unmatched concept included in the first concepts.

8. The apparatus according to claim 1, further comprising:
an editing unit that can edit the example in the second language included in the example set obtained from searching, based on a different portion between the input sentence and the example in the first language included in the searched example set, wherein
the determining unit compares a ratio of the first concepts or the second concepts to the unmatched concepts with a predetermined second threshold value, and determines that the example set can not be edited when the ratio is greater than the second threshold value;
the editing unit edits the example in the second language included in the example set, when the example set searching unit finds the example sets including the example in the first language that is analogous to the input sentence and when the determining unit does not determine that the example set can not be edited; and
an example translating unit obtains the example in the second language edited by the editing unit, as a translation result.

9. A machine translation method executed by a computer, comprising:
obtaining, by the computer, first concepts from a concept storage unit, the first concepts corresponding to words included in an example in a first language of an example set stored in an example storage unit, the concept storage unit storing a plurality of words in the first language, a plurality of words in a second language, and a plurality of concepts, each concept representing a meaning shared by words in the first language and second language, the example storage unit storing example sets including the one example set in which the plurality of words in the first language and the second language in each example set have possibly equivalent meanings;

obtaining second concepts from the concept storage unit, the second concepts each corresponding to a word included in the example in the second language of the example set stored in the example storage unit; wherein the word included in the example in the second language corresponds to a word in the first language with a shared meaning;

determining whether there is any unmatched concept between the first concepts and the second concepts;

determining that an example set having an unmatched concept is not applicable in at least one translation direction when there is an unmatched concept;

receiving an input sentence in the first language;

searching for any example sets that include an example in the first language that is analogous to or matches the input sentence;

deleting example sets from use in said at least one translation direction that are determined as inapplicable in that one translation direction from the searched example sets; and outputting an example in the second language included in the example sets that are not deleted.

10. A computer program product having a non-transitory computer readable medium storing programmed instructions for performing machine translation, wherein the instructions, when executed by a computer, cause the computer to perform:

obtaining first concepts from a concept storage unit, the first concepts corresponding to words included in an example in a first language of an example set stored in an example storage unit, the concept storage unit storing a plurality of words in the first language, a plurality of words in a second language, and a plurality of concepts, each concept representing a meaning shared by words in the first language and the second language, the example storage unit storing example sets including the one example set in which the plurality of words in the first language and the second language in each example have possibly equivalent meanings;

obtaining second concepts from the concept storage unit, the second concepts each corresponding to a word included in the example in the second language of the example set stored in the example storage unit wherein the word included in the example in the second language corresponds to a word in the first language with a shared meaning;

determining whether there is any unmatched concept between the first concepts and the second concepts;

determining that an example set having an unmatched concept is not applicable in at least one translation direction when there is an unmatched concept;

receiving an input sentence in the first language;

searching for any example sets that include an example in the first language that is analogous to or matches the input sentence;

deleting example sets from use in said at least one translation direction that are determined as inapplicable in that one translation direction from the searched example sets; and outputting an example in the second language included in the example sets that are not deleted.

* * * * *